United States Patent
Neudorf

(10) Patent No.: US 12,367,197 B2
(45) Date of Patent: Jul. 22, 2025

(54) PIPELINING A BINARY SEARCH ALGORITHM OF A SORTED TABLE

(71) Applicant: Ciena Corporation, Hanover, MD (US)

(72) Inventor: Kenneth Edward Neudorf, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/526,359

(22) Filed: Dec. 1, 2023

(65) Prior Publication Data

US 2025/0181583 A1    Jun. 5, 2025

(51) Int. Cl.
*G06F 16/2455* (2019.01)
*G06F 16/22* (2019.01)
*G06F 16/242* (2019.01)

(52) U.S. Cl.
CPC .... *G06F 16/24558* (2019.01); *G06F 16/2282* (2019.01); *G06F 16/2425* (2019.01)

(58) Field of Classification Search
CPC .......... G06F 16/24558; G06F 16/2282; G06F 16/2425
See application file for complete search history.

(56) References Cited

U.S. PATENT DOCUMENTS

| | | | | |
|---|---|---|---|---|
| 6,161,144 A * | 12/2000 | Michels | ......... | H04L 12/56 370/392 |
| 6,810,037 B1 * | 10/2004 | Kalapathy | ......... | H04L 45/54 709/215 |
| 7,317,725 B2 | 1/2008 | Etemadi et al. | | |
| 7,701,941 B2 * | 4/2010 | O'Callaghan | ....... | H04L 49/3009 370/395.54 |
| 7,769,015 B2 | 8/2010 | Huang | | |
| 8,886,878 B1 | 11/2014 | Neudorf et al. | | |
| 9,444,566 B1 | 9/2016 | Mustiere et al. | | |
| 9,497,522 B2 | 11/2016 | Neudorf | | |
| 10,374,786 B1 | 8/2019 | Mustiere et al. | | |
| 11,018,674 B1 | 5/2021 | Neudorf et al. | | |

(Continued)

FOREIGN PATENT DOCUMENTS

| | | | | |
|---|---|---|---|---|
| EP | 3091450 A1 * | 11/2016 | ....... | G06F 16/90344 |
| EP | 4124970 A1 * | 2/2023 | ....... | G06F 16/24552 |

OTHER PUBLICATIONS

Vivado Design Suite, "Binary CAM Search v2.6," LogiCORE IP Product Guide, PG317 (v2.6) Nov. 1, 2023, pp. 1-55.

*Primary Examiner* — Boris Gorney
*Assistant Examiner* — Robert F May
(74) *Attorney, Agent, or Firm* — Baratta Law PLLC; Lawrence A. Baratta, Jr.

(57) ABSTRACT

Pipelining a binary search algorithm of a sorted table is performed by breaking a single sorted table into multiple smaller tables, such that a binary search can produce a result every clock cycle. A process includes storing a plurality of tables that collectively form a single sorted table that includes addresses and entries corresponding to each address where the entries are sorted, each of the plurality of tables include a subset of the addresses and corresponding entries; and performing a binary search where each iteration of the binary search searches one of the plurality of tables such that a complete search traverses through all of the plurality of tables and such that a plurality of searches are performable concurrently pipelined through each of the plurality of tables.

16 Claims, 6 Drawing Sheets

(56) References Cited

U.S. PATENT DOCUMENTS

| | | | |
|---|---|---|---|
| 2003/0028530 A1* | 2/2003 | Nagaraja | G06F 16/9017 |
| | | | 707/E17.037 |
| 2003/0058864 A1* | 3/2003 | Michels | H04L 49/30 |
| | | | 370/392 |
| 2004/0139063 A1* | 7/2004 | Moskovich | G06F 16/22 |
| 2008/0059412 A1* | 3/2008 | Tarin | G06F 16/283 |
| 2022/0155991 A1 | 5/2022 | Neudorf | |
| 2024/0028228 A1* | 1/2024 | Jayanti | G06F 3/0604 |

* cited by examiner

PIPELINING A BINARY SEARCH ALGORITHM OF A SORTED TABLE

FIELD OF THE DISCLOSURE

The present disclosure relates generally to networking and computing. More particularly, the present disclosure relates to systems and methods for pipelining a binary search algorithm of a sorted table.

BACKGROUND OF THE DISCLOSURE

A binary search algorithm (or just binary search) is a process that finds the position of a target value in a sorted table. The binary search can also be referred to as a half-interval search, logarithmic search, binary chop, or other terms. The sorted table can also be referred to as an array, index, memory, or any equivalent term, and the sorted table is stored in memory and includes two or more sets of values in rows or the like. The table is sorted based on one of the values, call it the sorted value, and the objective of the binary search is to find a target value in the sorted table to obtain one or more associated values at that row. For example, in a practical use case, the sorted values are some addresses in packet headers and the associated values can be addresses for looking up packet instructions, e.g., forwarding instructions. The binary search begins by comparing an element in the middle of the sorted table with the target value. If the target value matches the element, its position in the sorted table is returned. If the target value is less than the element, the search continues in the lower half of the sorted table. If the target value is greater than the element, the search continues in the upper half of the sorted table. By doing this, the binary search eliminates the half in which the target value cannot lie in each iteration.

BRIEF SUMMARY OF THE DISCLOSURE

The present disclosure relates to systems and methods for pipelining a binary search algorithm of a sorted table. Conventionally, the sorted table is a single table construct, and, when searched, must use a minimum of N clock cycles (for a table of size $2^N$) to find the matching data within the table. This results in very poor throughput which is why this type of table is normally not used for high-speed search applications (e.g., packet lookup). Also, the single table has to be locked to a single search until an entry is found or the entire table is searched. To overcome these deficiencies, the present disclosure provides a unique way to store the sorted table in memory, namely one which does not increase the memory size but allows pipelining of searches such that the time between consecutive searches is reduced to a single clock cycle. By breaking the sorted table into smaller sections, each section can run a new search on every clock cycle, greatly improving performance. The approach described herein produces the absolute fastest solution for searching a sorted table without impacting memory usage, i.e., the amount of memory usage does not increase, namely results every clock cycle.

In an embodiment, an apparatus includes memory where a plurality of tables are stored and collectively the plurality of tables form a single sorted table that includes addresses and entries corresponding to each address where the entries are sorted, each of the plurality of tables include a subset of the addresses and corresponding entries; and circuitry configured to perform a binary search where each iteration of the binary search searches one of the plurality of tables such that a complete search traverses through all of the plurality of tables and such that a plurality of searches are performable concurrently pipelined through each of the plurality of tables.

Each subsequent table of the plurality of tables contains middle entries that are searched based on a result of searching a current table before the subsequent table. The circuitry can be configured, for each iteration, to output one of (1) a match if a target entry is in a current table of the plurality of tables. or (2) a search address to search in a next table of the plurality of tables. The next table includes middle entries from the current table where the middle entries represent splitting the current table in the binary search. The search address can be determined based on a lookup that selects the associated middle entries of the middle entries based on whether the target entry is higher or lower than a search address searched in the current table.

The single sorted table can have a size of $2^N$ where N is an integer, wherein there are N of the plurality of tables with a first table size 2, a second table of size 2, a third table of size $2^2$, a fourth table of size $2^3$, and an Nth table of size $2^{N-1}$. The binary search produces a result for a search of each of the plurality of searches every clock cycle after N clock cycles. A size in the memory of the plurality of tables can equal a size that the single sorted table would occupy in the memory. The memory and circuitry can be in one of a Field Programmable Gate Array (FPGA) and an Application Specific Integrated Circuit (ASIC). The entries can include data from packets and wherein the corresponding addresses for the entries are used as a pointer in another table for fetching instructions for the packets.

In another embodiment, a method includes storing a plurality of tables that collectively form a single sorted table that includes addresses and entries corresponding to each address where the entries are sorted, each of the plurality of tables include a subset of the addresses and corresponding entries; and performing a binary search where each iteration of the binary search searches one of the plurality of tables such that a complete search traverses through all of the plurality of tables and such that a plurality of searches are performable concurrently pipelined through each of the plurality of tables.

Each subsequent table of the plurality of tables contains middle entries that are searched based on a result of searching a current table before the subsequent table. The method can further include, for each iteration, outputting one of (1) a match if a target entry is in a current table of the plurality of tables. or (2) a search address to search in a next table of the plurality of tables. The next table includes middle entries from the current table where the middle entries represent splitting the current table in the binary search. The search address can be determined based on a lookup that selects the associated middle entries of the middle entries based on whether the target entry is higher or lower than a search address searched in the current table.

The single sorted table can have a size of $2^N$ where N is an integer, wherein there are N of the plurality of tables with a first table size 2, a second table of size 2, a third table of size $2^2$, a fourth table of size $2^3$, and an Nth table of size $2^{N-1}$. The binary search produces a result for a search of each of the plurality of searches every clock cycle after N clock cycles. A size in memory of the plurality of tables can equal a size that the single sorted table would occupy in the memory. The storing can be in one of a Field Programmable Gate Array (FPGA) and an Application Specific Integrated Circuit (ASIC). The entries can include data from packets and wherein the corresponding addresses for the entries are used as a pointer in another table for fetching instructions for the packets.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for pipelining a binary search algorithm of a sorted table.

Example Sorted Table

Figure 1:
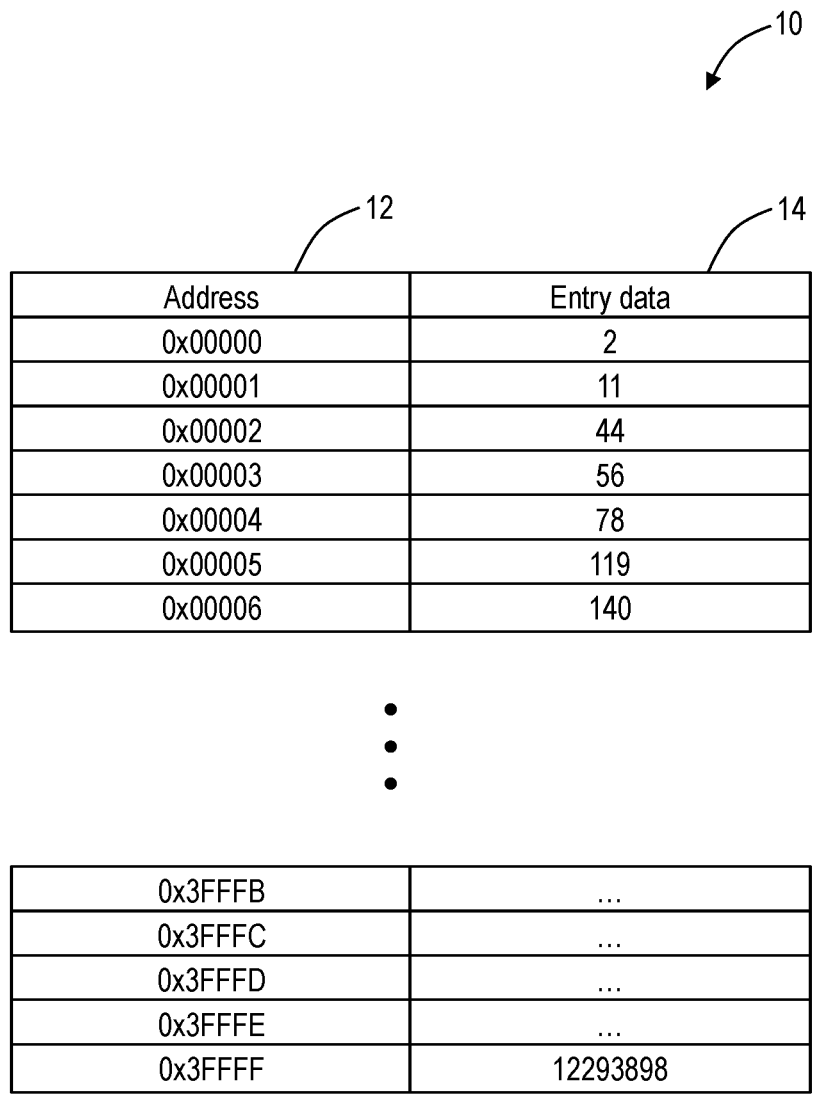
FIG. 1 is a diagram illustrating an example sorted table having addresses and entry data associated with each address.

FIG. 1 is a diagram illustrating an example sorted table 10 having addresses 12 and entry data 14 associated with each address 12. Of note, the addresses 12 are sequential and the entry data 14 written to the addresses 12 in order as well, thus the entry data 14 is sorted making this a "sorted" table. The various examples described herein will use a table of size 262,144 (i.e., number of rows or addresses 12) which is equal to $2^{18}$ for illustration purposes. Here, in FIG. 1, the sorted table has addresses 12 ranging from 0x00000 to 0x3FFFF where the "0x" denotes these values are listed in hexadecimal, so the addresses 12 range from 0 to 262,143 in decimal. Those skilled in the art will clearly recognize the approach described herein works for any sorted table 10 having a size $2^N$ where N is an integer applies. That is, the present disclosure describes breaking the size $2^N$ sorted table 10 into N smaller tables so that the N smaller tables have the same number of addresses 12 as a single $2^N$ sorted table 10 with the advantage of supporting pipelining of a binary search. Also, of note, practical cases of N=1, 2, 3, etc. are trivial in terms of searching, and it is expected that practical implementations will involve N>10, such as N=18 as described herein for illustration purposes. Further, the sorted table 10 does not necessarily have to be exactly sized $2^N$ as it is possible to provide custom implementations breaking the sorted table 10 up, ensuring every entry is searched. For example, using the sized $2^N$ approach and ignoring some entries in the last table is one way to have a custom size.

Example Use Case

Those skilled in the art will appreciate searching the sorted table 10 can have various practical applications. The sorted table 10 is realized in circuitry, such as in a Field Programmable Gate Array (FPGA), Application Specific Integrated Circuit (ASIC), some variant of computer memory, and the like. An implementation can be hardware-based for fast lookup, but it is also possible to implement the approach described herein in software. In an example embodiment, the sorted table 10 can relate to packet forwarding or processing. Here, circuitry can receive a packet which can have overhead, data, etc. from which some value for the entry data 14 is obtained. The value is searched in the sorted table 10 and the result is the address 12 where that entry data 14 is located. The result is used as a pointer to another table which contains a list of commands to perform on the packet. Such lookups, i.e., searches, need to be fast as packet processing operates at gigabit speeds and higher. Of course, those skilled in the art will recognize this is just one practical example and any example is contemplated herewith, including circuit implementations, software implementations for lookup in memory, and the like.

Conventional Binary Search

In FIG. 1, assume we have a search value of 56 ("target value") that we want to find what the corresponding address 12 is (which is 0x00003). A conventional binary search begins by comparing an element in the middle of the sorted table 10 with the target value. If the target value matches the element, its address 12 in the sorted table 10 is returned. In this case, the element in the middle, at address 0x20000 will be higher than the target value (which is shown in FIG. 1 as the fourth entry in the sorted table 10). So, the conventional binary search will note the target value is lower than the middle entry and now search in the lower half of the sorted table 10, at that middle entry, e.g., 0x10000. Again, the conventional binary search will keep iterating by searching middle entries in higher or lower tables until the target value is found or the entire sorted table 10 has been iterated and there is no match.

The conventional binary search operates on the sorted table 10 which is a single logical construct in memory. The conventional binary search takes a minimum of N clock cycles to iterate through the sorted table 10 of size $2^N$ and only one search can be performed at a time in the sorted table 10 as a single logical construct. As such, the conventional binary search has poor throughput and is not typically used in high-speed search applications (e.g., packet forwarding and processing).

Breaking Up the Sorted Table

Figure 2:
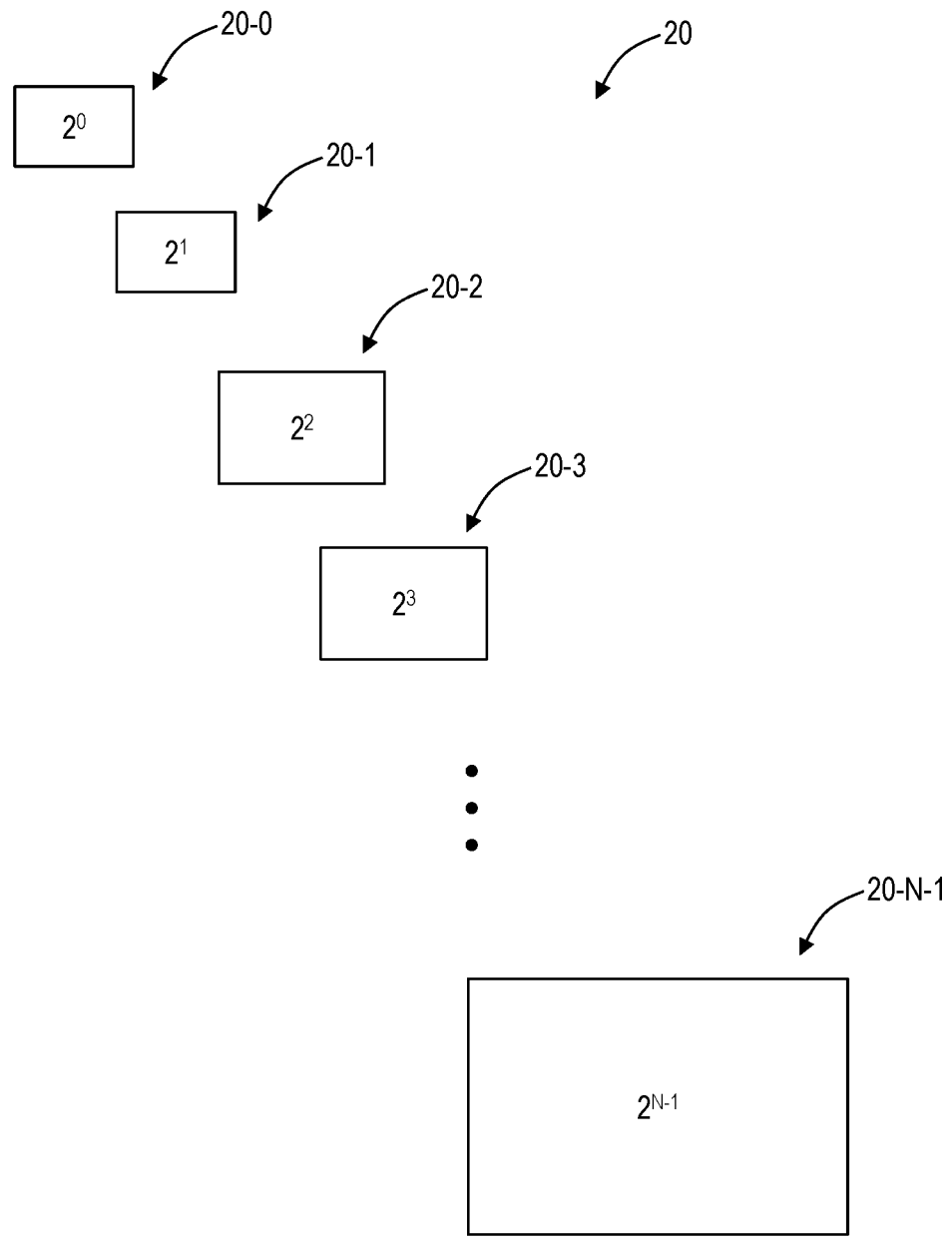
FIG. 2 is a logical diagram of the sorted table of FIG. 1 broken into N smaller tables.

Since the conventional binary search operates in steps where the sorted table 10 is searched by splitting it in half each iteration, it is possible to arrange the sorted table 10 to allow a pipelined search. FIG. 2 is a logical diagram of the sorted table 10 broken into N smaller tables 20. Specifically, the N tables 20 are each accessible by a separately calculated search address so that multiple searches can be performed concurrently, i.e., pipelined. Breaking the sorted table 10 into N tables 20 each accessed by separately calculated search address, means even though search time for a single search is unchanged, the time between consecutive searches is reduced to a single clock cycle.

For illustration purposes, the sorted table 10 is described as size $2^N$ and it is broken into N smaller tables for each successive search iteration. The smaller tables 20 can be realized based on granularity in the circuitry, such as Random Access Memory (RAM) blocks within an FPGA. The sorted table 10 of size $2^N$ is broken or partitioned into N smaller tables 20 of sizes 2 (special case), $2^1$, $2^2$, $2^3$, $2^4$ . . . $2^{N-1}$. Thus, this breaking or partitioning of the sorted table 10 does not increase or decrease the actual memory size, i.e., the total RAM is still the same as the single sorted table 10, just broken up across the smaller tables.

By doing this, each table 20 can be searched for new data every clock cycle, and by pipelining the tables 20 in sequence. The output of the search of each intermediate table 20 is either a match (if found) or a search address in the next table to search. Conceptually, each subsequent table 20 will have the middle entries to search for the next iteration of the binary search. For example, the first table 20-0 will have the middle entry (and the first entry which is why this is a special case). The second table 20-1 will have the middle entries for the top half of the sorted table 10 and the bottom half of the sorted table, e.g., the entries at ¼ of the sorted table 10 and ¾ of the sorted table 10. What the output search of each stage is the match (if found) or the search address in the next table to search, namely the next higher or lower value in the traditional binary search. The output of the last table 20 will be the search results for the entire combined table.

Since each table 20 can start a new search every clock cycle, the rate of search results becomes 1 per clock cycle from the original minimum of N clock cycles it would take to search the sorted table 10 of size $2^N$. In addition, normally it takes 2 or 3 times 2N number of clock cycles to search a single table, as you need to wait for the read results from the table 10 and then calculate the next search address for that same table. By breaking the full tables into one table per search address, all these extra clock cycles can be pipelined which removes them from the overall search time, when calculated per search. That is, because of the structure of the tables 20, the next iteration knows exactly where to search in the next table 20 based on whether the target value is higher or lower than the entry search in the current table. So, there is no need to calculate the next search address, but rather this can be based on a simple lookup table.

Memory, Circuitry, and Associated Process

In an embodiment, an apparatus includes memory where a plurality of tables 20 are stored and collectively the plurality of tables 20 form a single sorted table 10 that includes addresses 12 and entries 14 corresponding to each address 12 where the entries 14 are sorted, each of the plurality of tables 20 include a subset of the addresses 12 and corresponding entries 14; and circuitry configured to perform a binary search where each iteration of the binary search searches one of the plurality of tables 20 such that a complete search traverses through all of the plurality of tables 20 and such that a plurality of searches are performable concurrently pipelined through each of the plurality of tables 20. Each subsequent table 20 of the plurality of tables 20 contains middle entries that are searched based on a result of searching a current table before the subsequent table.

The circuitry is configured, for each iteration, to output one of (1) a match if a target entry is in a current table of the plurality of tables. or (2) a search address to search in a next table of the plurality of tables. The next table includes middle entries from the current table where the middle entries represent splitting the current table in the binary search. The search address can be determined based on a lookup that selects the associated middle entries of the middle entries based on whether the target entry is higher or lower than a search address searched in the current table.

In an embodiment, the single sorted table has a size of $2^N$ where N is an integer, wherein there are N of the plurality of tables with a first table size 2, a second table of size 2, a third table of size $2^2$, a fourth table of size $2^3$, and an Nth table of size $2^{N-1}$. The binary search produces a result for a search of each of the plurality of searches every clock cycle after N clock cycles.

A size in the memory of the plurality of tables equals a size that the single sorted table would occupy in the memory. The memory and circuitry can be in a Field Programmable Gate Array (FPGA). The entries can include data from packets and wherein the corresponding addresses for the entries are used as a pointer in another table for fetching instructions for the packets.

Figure 3:
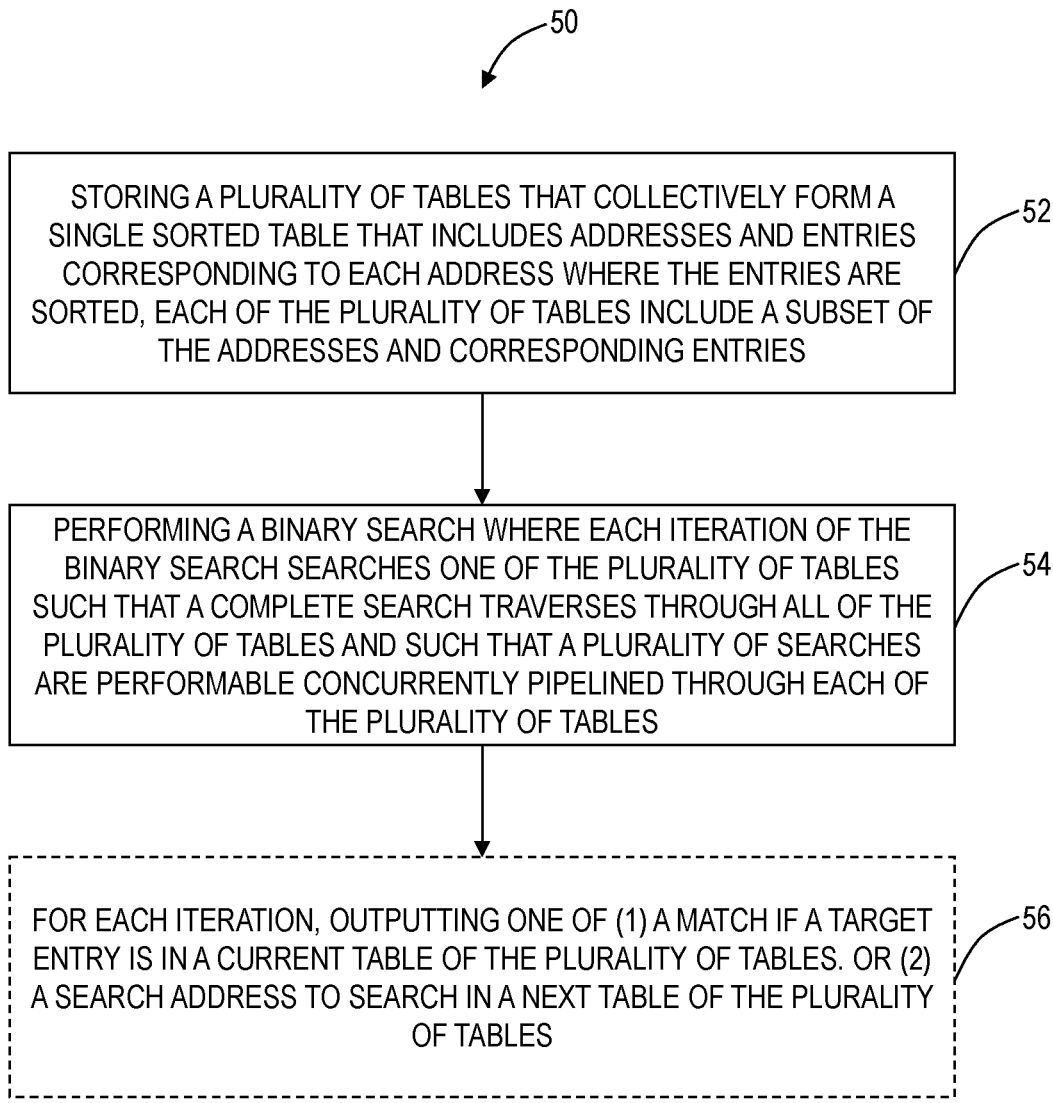
FIG. 3 is a flowchart of a process for pipelining a binary search algorithm of a sorted table.

FIG. 3 is a flowchart of a process 50 for pipelining a binary search algorithm of a sorted table. The process 50 contemplates implementation as a method having steps, via circuitry configured to implement the steps, and via a non-transitory computer-readable medium storing instructions that, when executed, cause one or more processors to implement the steps. That is, while some embodiments here describe a circuitry-based implementation, those skilled in the art will recognize this approach can also be implemented in software.

The process 50 includes storing a plurality of tables that collectively form a single sorted table that includes addresses and entries corresponding to each address where the entries are sorted, each of the plurality of tables include a subset of the addresses and corresponding entries (step 52); and performing a binary search where each iteration of the binary search searches one of the plurality of tables such that a complete search traverses through all of the plurality of tables and such that a plurality of searches are performable concurrently pipelined through each of the plurality of tables (step 54). Each subsequent table of the plurality of tables contains middle entries that are searched based on a result of searching a current table before the subsequent table.

The process 50 can further include, for each iteration, outputting one of (1) a match if a target entry is in a current table of the plurality of tables. or (2) a search address to search in a next table of the plurality of tables (step 56). The next table includes middle entries from the current table where the middle entries represent splitting the current table in the binary search. The search address can be determined based on a lookup that selects the associated middle entries of the middle entries based on whether the target entry is higher or lower than a search address searched in the current table.

In an embodiment, the single sorted table has a size of $2^N$ where N is an integer, wherein there are N of the plurality of tables with a first table size 2, a second table of size 2, a third table of size $2^2$, a fourth table of size $2^3$, and an Nth table of size $2^{N-1}$. The binary search produces a result for a search of each of the plurality of searches every clock cycle after N clock cycles.

A size in memory of the plurality of tables equals a size that the single sorted table would occupy in the memory. The storing can be in a Field Programmable Gate Array (FPGA). The entries can include data from packets and wherein the corresponding addresses for the entries are used as a pointer in another table for fetching instructions for the packets.

Example Implementation

Figure 4A:
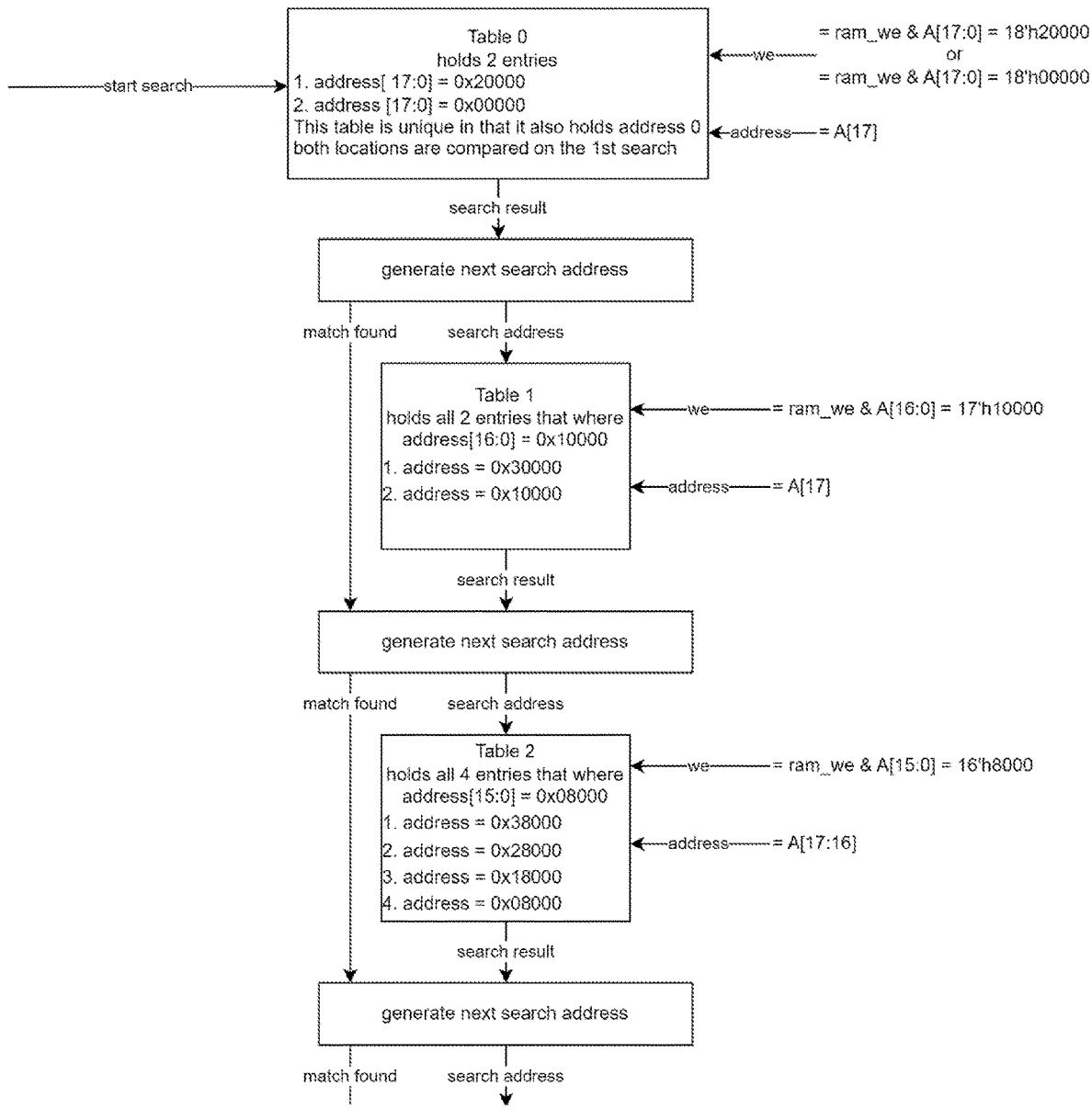
FIGS. 4A-4C are a diagram of an example implementation of the plurality of tables for a single sorted table of size $2^{18}$ (N=18).
Figure 4B:
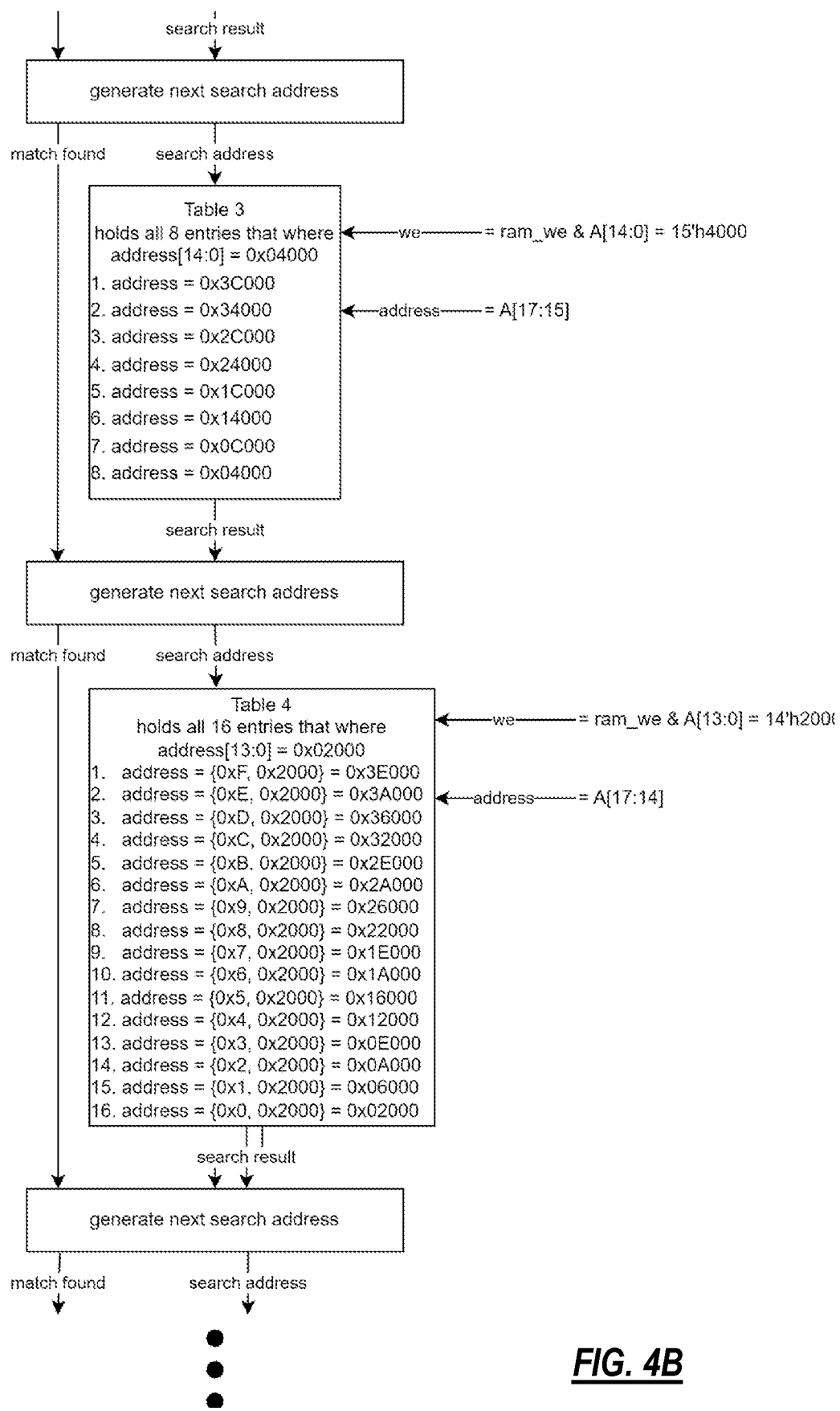
Figure 4C:
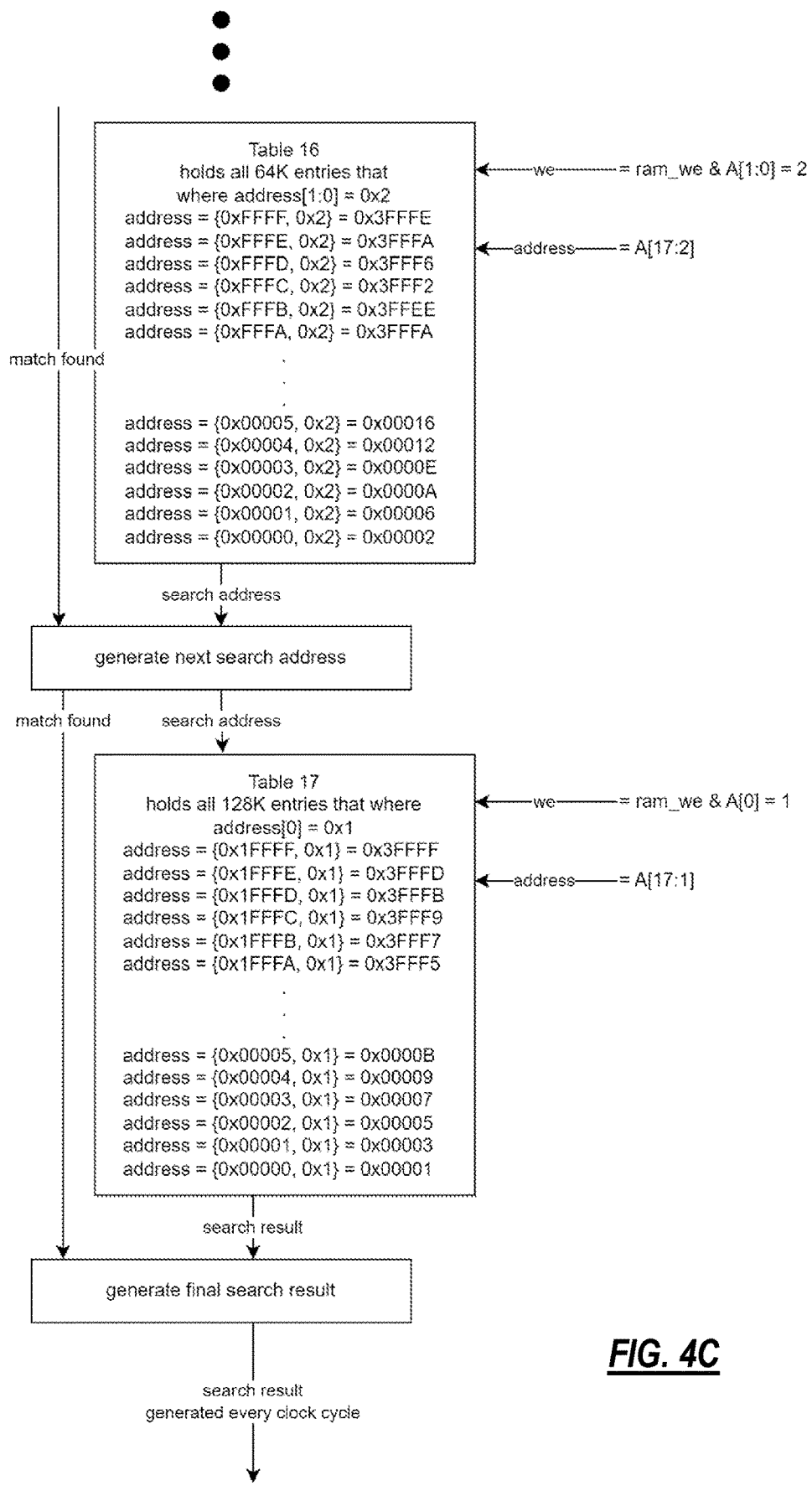

FIGS. 4A-4C are a diagram of an example implementation of the plurality of tables 20 for a single sorted table of size $2^{18}$ (N=18). FIGS. 4A-4C illustrate a flow through each of the 18 tables 20, namely table 0, table 1, and table 2 in FIG. 4A, table 3 and table 4 in FIG. 4B, and table 16 and table 17 (i.e., table N−2 and table N−1) in FIG. 4C. In these diagrams, the binary search is input in FIG. 4A from the left side, and the right side shows inputs for writing updates to the tables. Note, the updates are similarly pipelined through the tables.

Above, the tables 20 were described as having middle entries based on the binary search splitting the previous table in half. This can actually translate to tables 20 being based on the address bits. Specifically, the sorted table of size $2^{18}$ has 256K addresses total and these can be moved, partitioned, broken up, etc. into the tables 20 based on some of the address bits where each subsequent table uses fewer address bits to map the original address into one of the partitioned tables.

In FIG. 4A, the table 0 has two addresses, namely address locations where bits[17:0] of the search address are =0—there are 2 of those address matches, namely 0x00000 and 0x20000. Note, the first table 0 is a special case and has the absolute middle entry—0x20000 and the first entry—0x00000—both are searched on the first iteration. The table 1 contains all address entries, where bits[16:0] of the search address=0x10000—there are 2 of these addresses, namely 0x30000 and 0x10000, i.e., the ¼$^{th}$ and the ¾$^{th}$ entry. The table 2 contains all address entries, where bits[15:0] of the search address=0x8000—there are 4 of these addresses, namely 0x38000, 0x28000, 0x18000, and 0x08000.

In FIG. 4B, the table 3 contains all address entries, where bits[14:0] of the search address=0x4000—there are 8 of these addresses, as listed in FIG. 4B in the box for table 3. The table 4 contains all address entries, where bits[13:0] of the search address=0x2000—there are 16 of these addresses, as listed in FIG. 4C in the box for table 3. While not shown, the table 5, contains all address entries, where bits[12:0] of the search address=0x1000—there are 32 of these addresses. This pattern continues.

In FIG. 4C, the table 16 contains all address entries, where bits[1:0] of the search address=0x2—there are 64K of these addresses, as listed in FIG. 4C in the box for table 16. The final table 17 contains all address entries, where bits[0] of the search address=0x1—there are 128K of these addresses, as listed in FIG. 4C in the box for table 17.

To search through the tables 0 to 17, the process goes through each table sequentially in an iteration. Since this is a power of 2 search algorithm, the search addresses match the upper bits of each table as you go down through the tables. Start the search in table 0—and look at the midpoint of the table (address 0x20000)—to see if the entry data matches the search data (since this is the special case, we also check location 0), and based on the results of the search, you either search higher or lower than the previous entry in the table 1. The addresses for that next search are contained in the next table down, since the only 2 address possible are 0x10000, and 0x30000) those 2 addresses are in table 1, (which contains 2 entries).

The address pointer into each table can be generated as follows:
Table 0—special case—address[17]—all lower address bits assumed to be 0
Table 1—normal power of 2—address[17]—all lower address bits assumed to be 0x10000—and not used
Table 2—normal power of 2—address[17:16]—all lower address bits assumed to be 0x8000—and not used
Table 3—normal power of 2—address[17:15]—all lower address bits assumed to be 0x4000—and not used
Table 4—normal power of 2—address[17:14]—all lower address bits assumed to be 0x2000—and not used
Table 5—normal power of 2—address[17:13]—all lower address bits assumed to be 0x1000—and not used
Etc.

Advantages

One advantage of a sorted table 10 is it is 100% efficient in terms of RAM usage, but the disadvantage is the search is inefficient. The pipelined binary search described herein removes the search disadvantages. As such, storing the tables 20 results in lower power and RAM requirements for the same type of table using a different search algorithm (e.g., a hashing-based approach) as hash tables need to be larger than the maximum number of entries they support in order to minimize hash collisions. Also, there is no software involvement for collision resolution required for a binary sorted table versus a hashing table, as a binary sorted table supports 100% fill rate, as all entries are either moved up or down, within the table (by hardware) to insert a new entry into the table without the need to involve software. The efficiency is very important to FPGAs as memory is limited and being 100% efficient is critical to maximize the table size a FPGA can support.

CONCLUSION

Again, for illustration purposes, the sorted table 10 was described as size $2^N$ and it is broken into N smaller tables for each successive search iteration. Those skilled in the art will recognize other implementations consistent with the teaches provided herein are possible where the sorted table 10 has some other size besides $2^N$, such as by omitting or not using entries not needed in the last of the N tables 20. That is, it is possible to ignore or omit entries to have a custom size table 10 that does not exactly have a size $2^N$. As well, other approaches are also possible where the overall sorted table 10 is broken up to allow pipelining of steps in a binary search.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An apparatus comprising:
    memory where a plurality of tables are stored and collectively the plurality of tables form a single sorted table that includes addresses and entries corresponding to each address where the entries are sorted, each of the plurality of tables include a subset of the addresses and corresponding entries; and
    circuitry configured to perform a binary search where each iteration of the binary search searches one of the plurality of tables and a complete search traverses through all of the plurality of tables with a first table of the plurality of tables including a middle entry for the single sorted table and a first entry for the single sorted table, and the complete search ends after a final iteration at a last table of the plurality of tables, and a plurality of searches are performable concurrently pipelined through each of the plurality of tables,
    wherein each subsequent table of the plurality of tables contains middle entries that are searched based on a result of searching a current table before the subsequent table and each iteration of the complete search includes either a match for the binary search or an address to search in the subsequent table, and
    wherein the single sorted table has a size of $2^N$ where N is an integer greater than or equal to four, wherein there are N of the plurality of tables with a first table size 2, a second table of size 2, a third table of size $2^2$, and an Nth table of size $2^{N-1}$.

2. The apparatus of claim 1, wherein the circuitry is configured, for each iteration, to output one of (1) a match if a target entry is in a current table of the plurality of tables, or (2) a search address to search in a next table of the plurality of tables.

3. The apparatus of claim 2, wherein the next table includes middle entries from the current table where the middle entries represent splitting the current table in the binary search.

4. The apparatus of claim 2, wherein the search address is determined based on a lookup that selects the associated middle entries of the middle entries based on whether the target entry is higher or lower than a search address searched in the current table.

5. The apparatus of claim 1, wherein the binary search produces a result for a search of each of the plurality of searches every clock cycle after N clock cycles.

6. The apparatus of claim 1, wherein a size in the memory of the plurality of tables equals a size that the single sorted table would occupy in the memory.

7. The apparatus of claim 1, wherein the memory and circuitry are in one of a Field Programmable Gate Array (FPGA) and an Application Specific Integrated Circuit (ASIC).

8. The apparatus of claim 1, wherein the entries include data from packets and wherein the corresponding addresses for the entries are used as a pointer in another table for fetching instructions for the packets.

9. A method comprising:
    storing a plurality of tables that collectively form a single sorted table that includes addresses and entries corresponding to each address where the entries are sorted, each of the plurality of tables include a subset of the addresses and corresponding entries; and
    performing a binary search where each iteration of the binary search searches one of the plurality of tables and a complete search traverses through all of the plurality of tables with a first table of the plurality of tables including a middle entry for the single sorted table and a first entry for the single sorted table, and the complete search ends after a final iteration at a last table of the plurality of tables, and a plurality of searches are performable concurrently pipelined through each of the plurality of tables,
    wherein each subsequent table of the plurality of tables contains middle entries that are searched based on a result of searching a current table before the subsequent table and each iteration of the complete search includes either a match for the binary search or an address to search in the subsequent table, and
    wherein the single sorted table has a size of $2^N$ where N is an integer greater than or equal to four, wherein there are N of the plurality of tables with a first table size 2, a second table of size 2, a third table of size $2^2$, and an Nth table of size $2^{N-1}$.

10. The method of claim 9, wherein the steps further include for each iteration, outputting one of (1) a match if a target entry is in a current table of the plurality of tables, or (2) a search address to search in a next table of the plurality of tables.

11. The method of claim 10, wherein the next table includes middle entries from the current table where the middle entries represent splitting the current table in the binary search.

12. The method of claim 10, wherein the search address is determined based on a lookup that selects the associated middle entries of the middle entries based on whether the target entry is higher or lower than a search address searched in the current table.

13. The method of claim 9, wherein the binary search produces a result for a search of each of the plurality of searches every clock cycle after N clock cycles.

14. The method of claim 9, wherein a size in memory of the plurality of tables equals a size that the single sorted table would occupy in the memory.

15. The method of claim 9, wherein the storing is in one of a Field Programmable Gate Array (FPGA) and an Application Specific Integrated Circuit (ASIC).

16. The method of claim 9, wherein the entries include data from packets and wherein the corresponding addresses for the entries are used as a pointer in another table for fetching instructions for the packets.

\* \* \* \* \*